June 7, 1955  W. H. CHANNELL  2,709,844
CABLE SUPPORT
Filed April 4, 1952
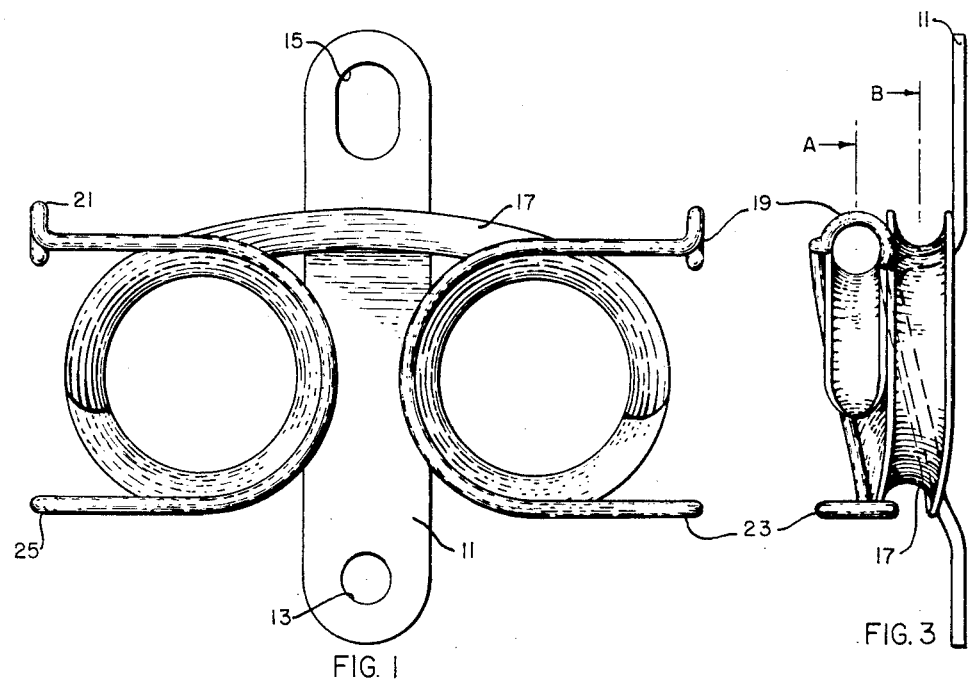
FIG. 1
FIG. 3
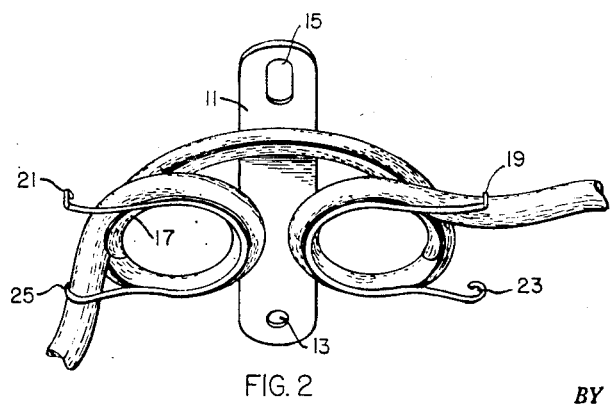
FIG. 2
INVENTOR.
WILLIAM H. CHANNELL
BY
Harry M. Saragovitz
Attorney

United States Patent Office 2,709,844
Patented June 7, 1955

2,709,844

CABLE SUPPORT

William H. Channell, San Marino, Calif.

Application April 4, 1952, Serial No. 280,635

5 Claims. (Cl. 24—129)

(Granted under Title 35, U. S. Code (1952), sec. 266)

The invention described herein may be manufactured and used by or for the Government for governmental purposes, without the payment of any royalty thereon.

The present invention relates to a cable support. In the laying of cable, particularly for communication use, it is often necessary that the cable be extended over a considerable distance. In the use of cable over such extended distances, it is necessary that the cable be supported at certain intervals to prevent the cable from falling to the ground which might result in damage to the cable. Supports for the cable are usually affixed to poles, trees, buildings, or to any convenient location affording means for supporting the cable. In supporting the cable, it is necessary that means be provided whereby the cable can be held in a device that will not allow the cable to slip or become distorted.

The present invention has as its primary object the design of a cable support that will support the cable at fixed intervals and securely hold the cable. An important feature of the invention resides in the fact that the cable so supported will not become distorted or unduly bent so as to prevent any damage to the cable. Another feature of the invention lies in the fact that the device described can be used as a dead end clamp wherein the cable terminates in the piece of equipment to which it is secured. Another feature of the invention is that the device herein described can be used indefinitely, as it has no moving parts that can possibly jam or fall loose, thereby destroying the effectiveness of such device.

The invention can best be understood from the following description taken in view of the accompanying drawing wherein Fig. 1 is a front view of the cable support; Fig. 2 is a top view in perspective of the support having a cable therein, and Fig. 3 is an end view of the device.

Referring particularly to the drawing, the device comprises essentially a plate 11 upon which the cable support is mounted or suitably held, such as by having the cable support welded to the plate. Plate 11 is provided with eyes 13 and 15 through which bolts, pins or screws can be inserted for securing the support to any pole, tree or structure.

For supporting and maintaining the cable, there is provided a continuous substantially helicoidally disposed trough, designated generally as 17, and comprises essentially a pair of linearally aligned substantially helicoidally shaped troughs, each of which are secured to a face of the plate 11. While, as can be observed from the drawings, it is obvious that trough 17 is continuous, reference to Fig. 3 will indicate that the trough lies in two planes designated plane A and plane B. Extending beyond and in alignment with the trough of plane A are a pair of vertically disposed guide eyes or hooks 19, 21. Likewise extending from the lowermost trough portion, are a pair of horizontally disposed guide eyes or hooks 23, 25, which serve as a guiding means for dead-ending a length of cable as hereinafter set forth. For ease of manufacture and assembly, it is proposed that the hooks 19, 21, 23 and 25 be the respective ends of two strands of wire that are secured to the front ends of the trough 17.

In using the cable support herein described, reference is made to Fig. 1, wherein the cable is fed through the guide eye 19 and looped through the substantially circular trough portion at the right hand side and carried over the substantially horizontally disposed portion and looped through the circular trough portion on the left hand side and brought through the guide hook 21 to the next supporting point.

In the modification shown in Fig. 2, the cable is shown drawn through the cable support. However, instead of continuing the cable to another supporting station as would be done through the guide eye 21, the cable is drawn downwardly through the guide eye 25 where it can be secured to the ground or to any piece of equipment, as desired.

While there has been described herein what is considered to be a preferred embodiment of the invention, it is obvious that modifications and changes may be made without departing from the spirit and scope of the invention as defined in the appended claims.

What is claimed is:

1. A cable support comprising a continuous strip of trough material, U-shaped in cross section, including two spaced helices and a generally horizontal intermediate portion merging tangentially with each of the helices near their uppermost portions, the two helices being wound in opposite directions, lying forward of the said intermediate portion with their axes parallel and horizontal, each helix being in excess of a full turn, the open side of the trough facing upward in the intermediate portion and away from the axes of the helices, whereby when the support is anchored at its rear, a suitable portion of a cable being strung may be placed in the trough of the intermediate portion, and adjacent portions of the cable be wound on the two helices, requiring neither end of the cable to be available when stringing the anchored support.

2. The support of claim 1 plus guide means located in a line tangent to the uppermost portions of the two helices each spaced from the proximate helix for limiting lateral movement of the cable with respect to such line.

3. The support of claim 1 plus an anchoring plate fast to both of the helices.

4. The support of claim 3 in which the plate is a generally vertical member, centrally offset rearwardly to form a bracket to support the base of the intermediate portion, said member having an upper end above the offset and in rear of the intermediate portion and having a lower end below the offset secured to the rear sides of the trough of the two helices, and in which cable guide members each with a rearwardly extending hook are secured to the forward margins of the two helices, with the opening of each hook facing down and spaced from the proximate helix to receive the cable between the member and the helix.

5. The support of claim 1 plus anchoring means located in rear of the strip and secured thereto, and a guide hook positioned away from each helix with its hook opening in a line with the top portions of the trough of the two helices and therefore in front of a line through the trough of the intermediate portion of the strip, said hook openings facing down and therefore preventing a cable wound on the strip from moving upwardly or laterally when suspended between a series of supports, whereby an intermediate portion of a cable may be rested in the trough of the intermediate portion of the support which is at the center of the strip, wound on the nearer helix, slipped under the nearer hook, wound on the farther helix, and slipped under the farther hook without either end of the cable being available, and the continuous winding of the cable on the two helices and on the intermediate portion connecting them distributes the stress of the pull caused by the unsupported lengths of the cable throughout the entire cross-section of the cable.

References Cited in the file of this patent

UNITED STATES PATENTS

| Number | Name | Date |
|---|---|---|
| D. 47,719 | Fox | Aug. 17, 1915 |
| 660,271 | Henderson | Oct. 23, 1900 |
| 778,253 | Leightham | Dec. 27, 1904 |
| 804,115 | Goodridge | Nov. 7, 1905 |
| 1,012,328 | Cope | Dec. 19, 1911 |
| 1,547,220 | Kipp | July 28, 1925 |
| 1,618,160 | Aldrich | Feb. 22, 1927 |
| 1,984,241 | Sumenius | Dec. 11, 1934 |
| 2,239,258 | Tallman | Apr. 22, 1941 |
| 2,468,035 | Carrol | Apr. 26, 1949 |